United States Patent
Chiarandini et al.

(10) Patent No.: US 10,318,581 B2
(45) Date of Patent: Jun. 11, 2019

(54) VIDEO METADATA ASSOCIATION RECOMMENDATION

(71) Applicant: Google Inc., Mountain View, CA (US)

(72) Inventors: Luca Chiarandini, Zurich (CH); Johan Georg Granstrom, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 502 days.

(21) Appl. No.: 15/098,126

(22) Filed: Apr. 13, 2016

(65) Prior Publication Data
US 2017/0300570 A1   Oct. 19, 2017

(51) Int. Cl.
| G06F 16/00 | (2019.01) |
| G06F 16/78 | (2019.01) |
| H04N 21/482 | (2011.01) |
| G06F 16/23 | (2019.01) |
| G06F 16/783 | (2019.01) |
| G06F 16/9535 | (2019.01) |
| H04N 21/24 | (2011.01) |
| H04N 21/8405 | (2011.01) |

(52) U.S. Cl.
CPC .............. *G06F 16/78* (2019.01); *G06F 16/23* (2019.01); *G06F 16/7834* (2019.01); *G06F 16/9535* (2019.01); *H04N 21/2407* (2013.01); *H04N 21/4828* (2013.01); *H04N 21/8405* (2013.01)

(58) Field of Classification Search
CPC ..................... G06F 17/30817; G06F 17/30958
See application file for complete search history.

(56) References Cited

U.S. PATENT DOCUMENTS

| 8,407,207 | B1* | 3/2013 | Chen ................. G06F 17/30817 707/713 |
| 8,566,315 | B1 | 10/2013 | Davtchev et al. |
| 8,620,951 | B1 | 12/2013 | He et al. |
| 2006/0173830 | A1* | 8/2006 | Smyth ............... G06F 17/30864 |
| 2012/0030191 | A1* | 2/2012 | Zwicky ............. G06F 17/30867 707/711 |

(Continued)

OTHER PUBLICATIONS

International Search Report and Written Opinion for PCT/US2016/067003, dated Mar. 10, 2017, 8 pages.

(Continued)

*Primary Examiner* — Grace Park
(74) *Attorney, Agent, or Firm* — Lowenstein Sandler LLP

(57) ABSTRACT

Methods and systems of providing metadata association with videos on a video hosting system on a computer network are provided. Search records associated with search queries directed to the video hosting system are received. Each search record identifies videos that are search results for a search query and indicates view durations that the videos were viewed responsive to the search query. First and second videos competing for views of users are identified from the received search records. The first and second videos each have metadata respectively describing the first and second videos. Search queries directed to the first video are identified from the search records. Search terms associated with the search queries are further identified and compared to the metadata of the second video. Search terms that are not included in the metadata of the second video are identified as metadata improvements to the second video.

19 Claims, 5 Drawing Sheets

(56) References Cited

U.S. PATENT DOCUMENTS

| | | |
|---|---|---|
| 2013/0109643 A1 | 5/2013 | Riggins et al. |
| 2013/0110809 A1* | 5/2013 | Locker .............. G06F 17/30067 |
| | | 707/708 |
| 2014/0212106 A1 | 7/2014 | Izo et al. |
| 2015/0331942 A1 | 11/2015 | Tan |

OTHER PUBLICATIONS

International Preliminary Report on Patentability for PCT/US2016/067003, dated Oct. 16, 2018, 6 pages.

* cited by examiner

VIDEO METADATA ASSOCIATION RECOMMENDATION

BACKGROUND OF THE INVENTION

Field of the Invention

This invention relates generally to online video and streaming services, and in particular to guiding viewers to particular videos on such services.

Description of the Related Art

Online systems store, index, and make available for consumption various forms of media content to Internet users. This content may take a variety of forms; in particular, video content, including streaming videos is widely available across the Internet. Online video systems allow users to view videos uploaded by other users.

Users can discover new content on online video systems via search. Typically, a user provides a search query and receives a list of videos as search results in return. These videos are usually ranked and presented to the user in an order based on the ranking. Higher-ranked videos are presented to users at more prominent positions than lower-ranked videos and more likely to attract users' visits. Among the search results for a search query, some videos include original content and are uploaded by content producers or partners; and some may use the original content and are uploaded by users who are not the content producers or partners. Videos that include original content are referred hereinafter as "original videos" and videos that are not created by original authors or creators but use the original content are referred hereinafter as "derivative videos." In other words, a derivative video includes at least some media content (e.g., video, audio) of the original video. Derivative videos compete with original videos for users' views, interfere with playing of the original videos, and complicate users' searches for the original videos. As a result, it is useful to distinguish original videos from derivative videos to safeguard interests of users as well as the interests of the content producers.

SUMMARY OF THE INVENTION

In one embodiment, a computer-implemented method of providing metadata association with videos on a video hosting system on a computer network includes receiving search records associated with search queries directed to the video hosting system. Each search record identifies a set of videos available on the video hosting system that are search results for a corresponding search query and indicates associated view durations that videos in the set were viewed responsive to the search query. The method identifies first and second videos competing for views of users of the video hosting system from the received search records. The first and second videos each have metadata respectively describing the first and second videos. The method identifies a first set of search queries directed to the first video from the search records. The first video is a search result for search queries of the first set. The method identifies search terms associated with the first set of search queries and further compares the identified search terms to the metadata of the second video. Responsive to the comparison indicating that the metadata of the second video does not include a search term, the method identifies the search term as a metadata improvement to the second video. The method further provides the metadata improvement to a user of the video hosting system associated with the second video.

In one embodiment, a video-hosting system comprises a computer processor and a non-transitory computer-readable storage medium storing instructions configured to cause the computer processor to receive search records associated with search queries directed to the video hosting system. Each search record identifies a set of videos available on the video hosting system that are search results for a corresponding search query and indicates associated view durations that videos in the set were viewed responsive to the search query. The instructions are configured to cause the computer processor to identify first and second videos competing for views of users of the video hosting system from the received search records. The first and second videos each have metadata respectively describing the first and second videos. The instructions are configured to cause the computer processor to identify a first set of search queries directed to the first video from the search records. The first video is a search result for search queries of the first set. The instructions are configured to cause the computer processor to identify search terms associated with the first set of search queries and to further compare the identified search terms to the metadata of the second video. The instructions are configured to cause the computer processor to, responsive to the comparison indicating that the metadata of the second video does not include a search term, identify the search term as a metadata improvement to the second video. The instructions are configured to cause the computer processor to provide the metadata improvement to a user of the video hosting system associated with the second video.

In one embodiment, a non-transitory computer-readable storage medium containing computer program code executable to perform steps comprising receiving search records associated with search queries directed to the video hosting system. Each search record identifies a set of videos available on the video hosting system that are search results for a corresponding search query and indicates associated view durations that videos in the set were viewed responsive to the search query. The steps include identifying first and second videos competing for views of users of the video hosting system from the received search records. The first and second videos each have metadata respectively describing the first and second videos. The steps include identifying a first set of search queries directed to the first video from the search records. The first video is a search result for search queries of the first set. The steps include identifying search terms associated with the first set of search queries and comparing the identified search terms to the metadata of the second video. The steps further include, responsive to the comparison indicating that the metadata of the second video does not include a search term, identifying the search term as a metadata improvement to the second video. The steps include providing to a user of the video hosting system associated with the second video.

DETAILED DESCRIPTION

System Architecture

Figure 1:
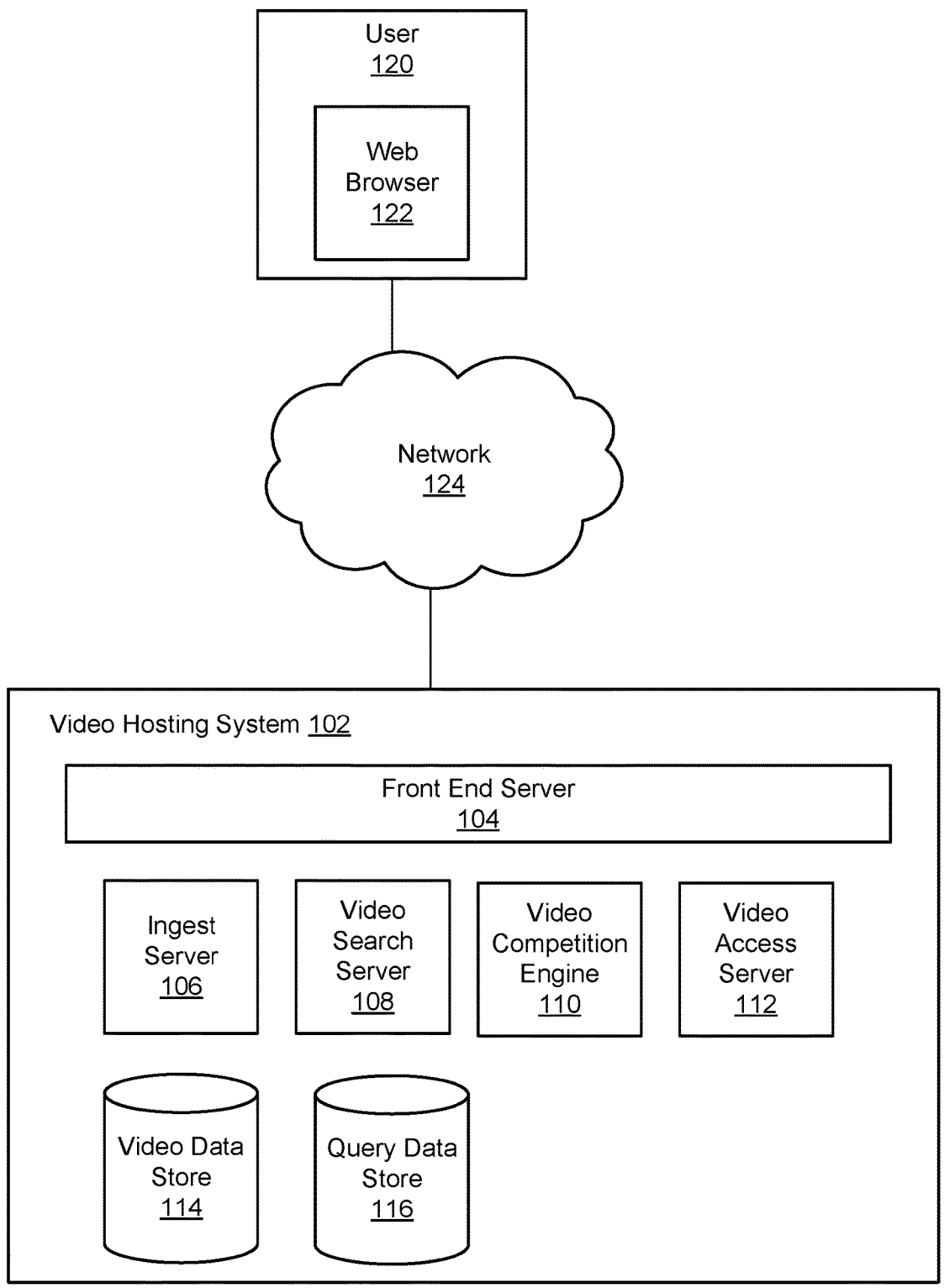
FIG. 1 is a high-level block diagram of a system assessing competitions among videos for users' views, according to one embodiment.

FIG. 1 is a high-level block diagram of a system assessing competitions among videos for users' views, according to one embodiment. FIG. 1 illustrates a video hosting system 102 and a user 120 connected by a network 124. The user 120 represents an entity that can access videos contained within the video hosting system 102. A user 120 can access a video from the video hosting system 102 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting system 102 is adapted to receive videos for storage in order to enable the sharing of the videos with other users.

In one embodiment, the user 120 uses a computer system to communicate with the video hosting system 102 over the network 124. In one embodiment, the computer system is a personal computer executing a web browser 122 such as GOOGLE CHROME that allows the user to view web pages and videos provided by the video hosting system 102. In another embodiment, the computer system is a mobile device such as a smartphone or tablet computer, or even a personal computer, that executes a software application ("app") providing specific functionality for accessing the video hosting system 102. The computer system used by the user 120 may also be another network-capable device such as a car entertainment system, television "set-top box," etc. Although FIG. 1 illustrates only a single user, it should be understood that many users (e.g., millions) can communicate with the video hosting system 102 at any time. The single user 120 is illustrated in order to simplify and clarify the present description.

The network 124 represents the communication pathways between the user and the video hosting system 102. In one embodiment, the network 124 is the Internet, but may also be any network, including but not limited to wired or wireless networks, cloud computing networks, private networks, virtual private networks, and any combination thereof In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting system 102 allows users to access video content via searching and/or browsing interfaces. The sources of videos can be from user uploads of videos, searches or crawls of other websites or databases of videos, or the like, or any combination thereof. For example, in one embodiment a video hosting system 102 can be configured to allow for user uploads of content; in another embodiment a video hosting system 102 can be configured to only obtain videos from other sources by crawling such sources or searching such sources in real time.

A suitable video hosting system 102 for implementation of the system is the YOUTUBE™ website. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting system 102 comprises a front end server 104, an ingest server 106, a video search server 108, a video competition engine 110, a video access server 112, a video data store 114, and a query data store 116. Many conventional features, such as firewalls, load balancers, application servers, failover servers, site management tools and so forth are not shown so as not to obscure the features of the system.

The front end server 104 handles all communication with the user via the network 124. The front end server 104 receives requests from users and communicates with the other servers of the video hosting system 102 in order to process the requests. The front end server 104 is further configured to monitor user interactions with the video hosting system 102. For example, if a user clicks on a web page, views a video, makes a purchase, opens a document, or fills a web-based form, the front end server 104 monitors these interactions. The front end server 104 may be further configured to transmit and present the requested video and related video links to the user on a webpage. The requested video is streamed by the front end server 104 to the user. One or more related video links appear on the webpage where the requested video is playing, such that the related video link can be selected by a user 120 in order to view the related videos.

Any content received via the network 124 from a user for posting to the video hosting system 102 is passed on to the ingest server 106 for processing. The processing of the video file includes assigning an identifier to the newly received video file. Other steps of processing the video file may include formatting (e.g., transcoding), compressing, metadata tagging, content analysis, and/or other data processing methods. Metadata of a video file includes tags that describe media content of the video file. For example, "Hemingway", "philosophy", and "meditate", "pugs" and "jazz" are all examples of tags. The user that posts the video file may provide tags that are associated with the video file as metadata. In addition, the ingest server 106 may analyze the media content of the video file to identify tags and associate the identified tags with the video file. In one embodiment, the user transmits a form along with the video file transmitted to the video hosting system 102. The user may include in the form information that describes the video (e.g., title, description, and tag information). The form information may also include an indication of the media type, which for uploaded videos would always be the "video" type. The ingest server 106 stores the processed video file in a video data store 114 and stores the information included in the form as metadata of the video file. The video data store 114 is the storage system where the video files transmitted to the video hosting system 102 are stored. A video may be accompanied by icons or thumbnail views, associated metadata, such as title, author, tags, description, comments, and rating.

The video search server 108 processes users' requests received by the front end server 104 and identifies videos that are relevant to the users' requests. A user request provided by a user to the front end server 104 may include a search query specifying one or more search terms. A search query is a query entered by a user to search for one or more videos that satisfy the user's information needs. A search query may include search terms that are text (e.g., keywords) and/or images that can be used to identify videos the user is interested in viewing. For example, a search query may include the search term "Kilimanjaro." The video search server 108 may use the search term, for example, to query the metadata of all video files stored in the video data store 114. The search results are the videos of which the associated metadata is relevant to the search term. For example, the search results for the search query "Kilimanjaro" include videos that are associated with metadata "Kilimanjaro" that matches the search term "Kilimanjaro". The search results from the query are transmitted to the front end server 104, so that the search results can be presented to the user. The search results may be ranked based on their relevancy to the search query and presented to the user in the ranked order. Videos that are more relevant are ranked higher than those that are less relevant to the search query.

The video search server 108 generates search logs and stores the generated search logs in the query data store 116. A search log includes information such as search queries that lead users to a video, videos to which a search query leads users, a number of times that a video has been viewed, an amount of time a video has been viewed, etc. For example, a search log may include information indicating that a documentary of global warming is the search result for both search queries "Kilimanjaro" and "Africa snow." The search log also includes information indicating that search results for the search query "Kilimanjaro" include the documentary of global warming, a video of a person hiking Mount Kilimanjaro, and a video of a singer's "Kilimanjaro" song are search results. The search log further includes information showing amounts of time (i.e., durations) that different users spent watching the documentary of global warming. In some embodiments, a search log includes a history of search records associated with the search queries. Each search record includes a search term, a user, a current time when the search was performed, search results (i.e., the videos that are returned to the user in response to the search query), identifiers of videos among the search results that are watched by the user, a view duration that each video was watched by the user, and other information.

The video access server 112 receives from the front end server 104 requests from users that wish to view a specific video. From the user perspective, a user may submit a request for a video by browsing the different categories of the video hosting system 102 or by clicking on a link to a video from a search results webpage. The request transmitted by the user can include the identifier of the video the user wishes to view (which can be included automatically once the user clicks on the link for the video). The video access server 112 uses the identifier to search and locate where the video is stored in the video data store 114. The video access server 112 provides the video requested to the front end server 104.

The video competition engine 110 determines videos' competition for users' views. When a search query produces multiple search results, the videos listed in these results compete for the user's views. In particular, derivative videos (i.e., videos of which the content is generated based on original content) divert users' views of original videos (i.e., videos of which the content is original). The video competition engine 110 determines a competition score between a pair of videos. The competition score measures the similarity between the search queries for which the two videos are competing. A higher competition score indicates an increased likelihood that the two videos will appear in the search results for the same search queries, while a lower competition score indicates a decreased likelihood that the two videos will appear in the search results for the same search queries. For example, a competition score of one may indicate that the two videos always appear in the search results of the same search queries and a competition score of zero may indicate that the two videos never appear together in the search results of any search queries.

In addition, the video competition engine 110 may determine an aggregated search competition score that measures the competition from all other videos collectively with a given video for users' views. For a given video, the aggregated search competition score may be determined by aggregating the individual competition scores determined for that video and other videos. A higher aggregated competition score indicates that there may be at least one other video competing with the video for very similar search queries or that there may be multiple other videos competing with the video for somewhat similar search queries. For example, an aggregated competition score of one indicates that there may be at least one other video competing with the video for the exact same search queries or there may be multiple other videos that are competing with the video for similar search queries. For a particular aggregated competition score, a quantity of the other videos that are competing with the video and the degree of similarity between search queries that the videos are competing for can be inversely correlated.

The video search server 108 or the video competition engine 110 may adjust the ranking of the search results of a search query based on the determined competition between videos. The search competition score and/or the aggregated search competition score may be used to demote videos such as derivative videos that compete with the original video to minimize their diversion of users' views of the original video. In addition, the aggregated search competition score may be used to determine an originality of a channel formed by a collection of videos. The originality of the channel may be used to reward the channel. The video competition engine 110 may monitor traffic that goes to the original video and derivative videos (e.g., a number of times being viewed by users, a view duration being viewed by users). The video competition engine 110 may identify metadata of the derivative videos that does not exist in the original video and suggest to the owner of the original video to include the metadata in the original video.

It should be appreciated that the data processing operations of the video competition engine 110, as described herein, inherently require a programmed computer system for their practical implementation. To simplify and clarify the present description, the content received and shared by the video hosting system 102 is generally referred to as videos, video files, or video items, as appropriate for the video-specific embodiments described herein, but it should be understood that the video hosting system 102 can receive and share content of any media type. This content may be referred to as media content items, media items, or items. Thus, the operations of the video competition engine 110 described herein for determining competition among video files can be applied to any type of media content item, not only videos; other suitable type of content items include audio files (e.g. music, podcasts, audio books, and the like), documents, multimedia presentations, digital purchases of goods and services, and so forth.

Video Competition Engine

Figure 2:
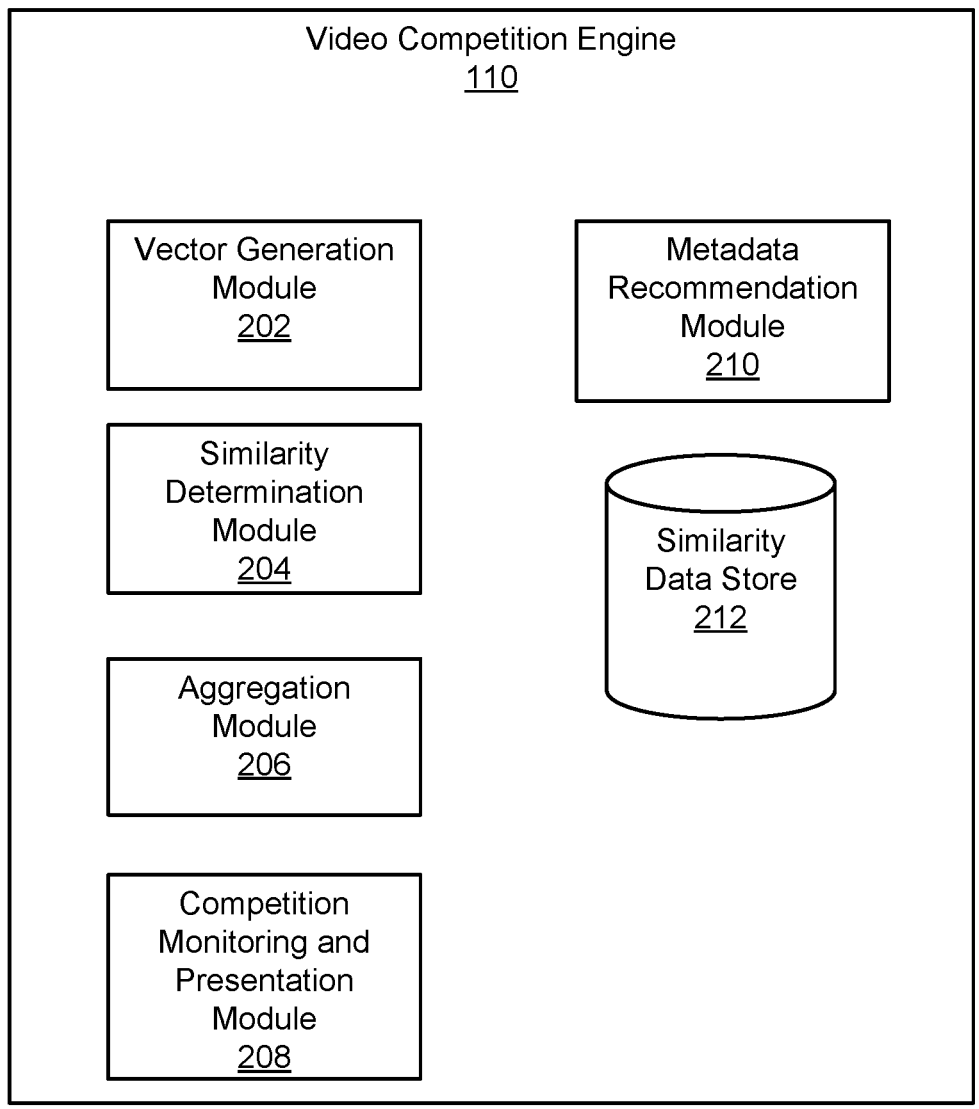
FIG. 2 is a block diagram of a video competition engine, according to one embodiment.

FIG. 2 is a high-level block diagram illustrating a detailed view of the video competition engine 110, according to one embodiment. As shown in FIG. 2, the video competition engine 110 includes several modules. Those of skill in the art will recognize that other embodiments can have different modules than the ones described here, and that the functionalities can be distributed among the modules in a different manner. In addition, the functions ascribed to the video competition engine 110 can be performed by multiple engines. As illustrated, the video competition engine 110 includes a vector generation module 202, a similarity determination module 204, an aggregation module 206, a competition monitoring and presentation module 208, a metadata recommendation module 210, and a similarity data store 212.

The vector generation module 202 generates a vector for a video. The vector represents a duration of a video being watched by users responsive to search queries. The vector generation module 202 may analyze the information in the query data store 116 to generate vectors for videos. For example, the vector generation module 202 identifies all or some search queries from the query data store 116. In addition, for each identified search query, the vector generation module 202 determines the video(s) to which the search query is directed and a duration that the video was watched in response to receiving search results based on the query. That is, the videos included in the search results for the search query are identified and the duration that the video was watched responsive to the search query is determined. For a video, the vector generation module 202 generates a vector according to Equation (1):

$$V = \{V_n\} \in \mathbb{Q} \qquad (1),$$

where $\mathbb{Q}$ is a query space of the identified search queries, of which each dimension corresponds to one query $q_i$; and $V_n$ is an amount of time the video was watched responsive to the corresponding search query $q_n$. In other words, the query space $\mathbb{Q}$ is a collection of the search queries q. A vector V that represents a video is a linear combination of the search queries $q_n$ (i.e., basis vectors) of which the search results include the video. The scalar of each basis vector $q_n$ (i.e., a search query) is the amount of time the video was watched responsive to that search query.

The similarity determination module 204 measures a similarity between search queries for which one video and another video compete. As described herein, two videos compete for a search query if they are among the search results for the search query. The similarity determination module 204 may determine a search competition score that measures the similarity between a set of search queries that lead users to one video and another set of search queries that lead the users to the other video. In the query space, vectors that represent videos that compete for the same queries point in the same direction because the vectors have identical basis vectors. In one embodiment, the similarity determination module 204 determines a search competition score $SCS(v_i, v_j)$ for two videos according to Equation (2):

$$SCS(V_i, V_j) = \frac{V_i \cdot V_j}{|V_i||V_j|}, \qquad (2)$$

where $v_i$ is a vector generated for the first video i and $v_j$ is a vector generated for the second video j. The search competition score $SCS(v_i, v_j)$ is a measure of the degree of similarity between the vectors generated for two videos of an inner product space that measures the cosine of the angle between the vectors. The determined search competition score $SCS(v_i, v_j)$ is a value in the range of zero to one. As mentioned earlier, a higher search competition score indicates a greater similarity between search queries for which the videos compete. The similarity determination module 204 may store the determined search competition scores $SCS(v_i, v_j)$ in the similarity data store 212.

The aggregation module 206 measures the similarity between search queries for which one video competes with other videos collectively. For a particular video, the aggregation module 206 may determine a collective search competition score that measures the similarity between a set of search queries that lead users to one video and another set of search queries that lead the users to the other videos.

In various embodiments, the collective search competition score has a value in the range of zero to one. The aggregation module 206 determines the collective search competition according to various rules. First, for a particular video, the aggregation module 206 determines that the collective search competition score is one if there is a search competition score for the particular video and another video that has a value of one. That is, if there is another video that competes with one video for identical search entries, the aggregation module 206 determines that the collective search competition score is one. Second, for a particular video, the aggregation module 206 determines that the collective search competition score is zero if all search competition scores for the particular video and all other videos are zero. That is, only if no other videos compete with a video for any search query will the aggregation module 206 determine that the collective search competition score is zero. In addition, the aggregation module 206 determines the relationship between a first collective search competition score for a first video and a given set of videos and a second collective search competition score for a second video and the given set of videos. The aggregation module 206 determines that, for any video of the given set, if the search competition score between the first video is less than the search competition score between the second video, the first collective search competition score is less than the second collective search competition score. The aggregation module 206 maintains the determined relationships when aggregating the search competition scores.

In one embodiment, the aggregation module 206 determines a collective search competition score for a particular video $gSCS(v_i)$ according to Equation (3):

$$gSCS(v_i) = f^{-1}\left(\sum_j f(SCS(v_i, v_j))\right), \qquad (3)$$

where $SCS(v_i, v_j)$ is a search competition score between the given video and one of the other videos, and the function $f(x)$ defines a one-to-one correspondence between the interval of zero to one to the interval of zero to infinity. In some embodiments, the function $f(x)$ is defined as $$\frac{x}{(1-x)}.$$

The aggregation module 206 may store the determined collective search competition scores $gSCS(v_i)$ in the similarity data store 212. The similarity data store 212 may store search competition scores determined for an original video and derivative videos and collective search competition scores determined for the original video.

For a particular video, the aggregation module 206 may determine the collective search competition score by aggregating the search competition scores determined for this video and other videos. The other videos may be determined based on content or owners. The other videos may include all the other videos that are search results of all search queries of the query space. For one video having particular content, the aggregation module 206 may aggregate the search competition scores determined for this video and derivative videos of the particular video. For example, the search competition scores determined for an original music video and derivative videos that include the entire or a section of the song are aggregated to determine a collective search competition score. For one video having particular content, the aggregation module 206 may aggregate the search competition scores determined for this video and all videos owned by the owner(s) of the derivative videos of this video. For example, the search competition scores determined for an original music video and all videos owned by the owner(s) of derivative videos that include the entire or a section of the song are aggregated to a collective search competition score.

The aggregation module 206 may further determine an originality of a channel formed by a collection of videos. The originality of a channel measures the overall similarity between search queries for which the collection of videos included in the channel and other videos compete. For each video included in the channel, the aggregation module 206 identifies competing videos based on the calculated search competition scores. The search competition scores determined for a video and its competing videos exceed a threshold. The aggregation module 206 can determine the view durations associated with the video from the search logs. In one embodiment, the aggregation module 206 calculates the originality of the channel according to Equation (4):

$$Q(c) = 1 - \frac{\Sigma_{v \in c} gSCS(v) \cdot \text{watchtime}(v)}{\Sigma_{v \in c} \text{watchtime}(v)}, \quad (4)$$

where gSCS(v) is the collective search competition score for a video v included in a channel C, and watchtime(v) is the view duration for a video v included in a channel C. The originality of the channel is a value in the range of zero to one. A channel of which the originality is one indicates that the channel attracts all users' views in comparison to its competing videos. A channel of which the originality is zero indicates that the videos included in the channel attract no users' views in comparison to its competing videos.

The competition monitoring and presentation module 208 monitors traffic (e.g., users' view counts and view durations) directed to different videos and presents a user interface displaying information related to the monitored traffic to users. The competition monitoring and presentation module 208 may analyze search logs to monitor traffic directed to different videos. The competition monitoring and presentation module 208 parses the search logs to categorize traffic by destination (e.g., original videos, derivative videos of an original video.) For traffic that goes to an original video, the competition monitoring and presentation module 208 may categorize the traffic by search queries, view counts of the original video in response to the search queries, view durations of the original video in response to the search queries, user attributes (e.g., demographics, location, etc.) associated with the search queries, and the like.

The competition monitoring and presentation module 208 analyzes the monitored traffic and presents a user interface displaying information related to the analysis of the monitored traffic to users. In one embodiment, the competition monitoring and presentation module 208 generates a user interface presenting information related to the monitored traffic to owners of videos.

Figure 4:
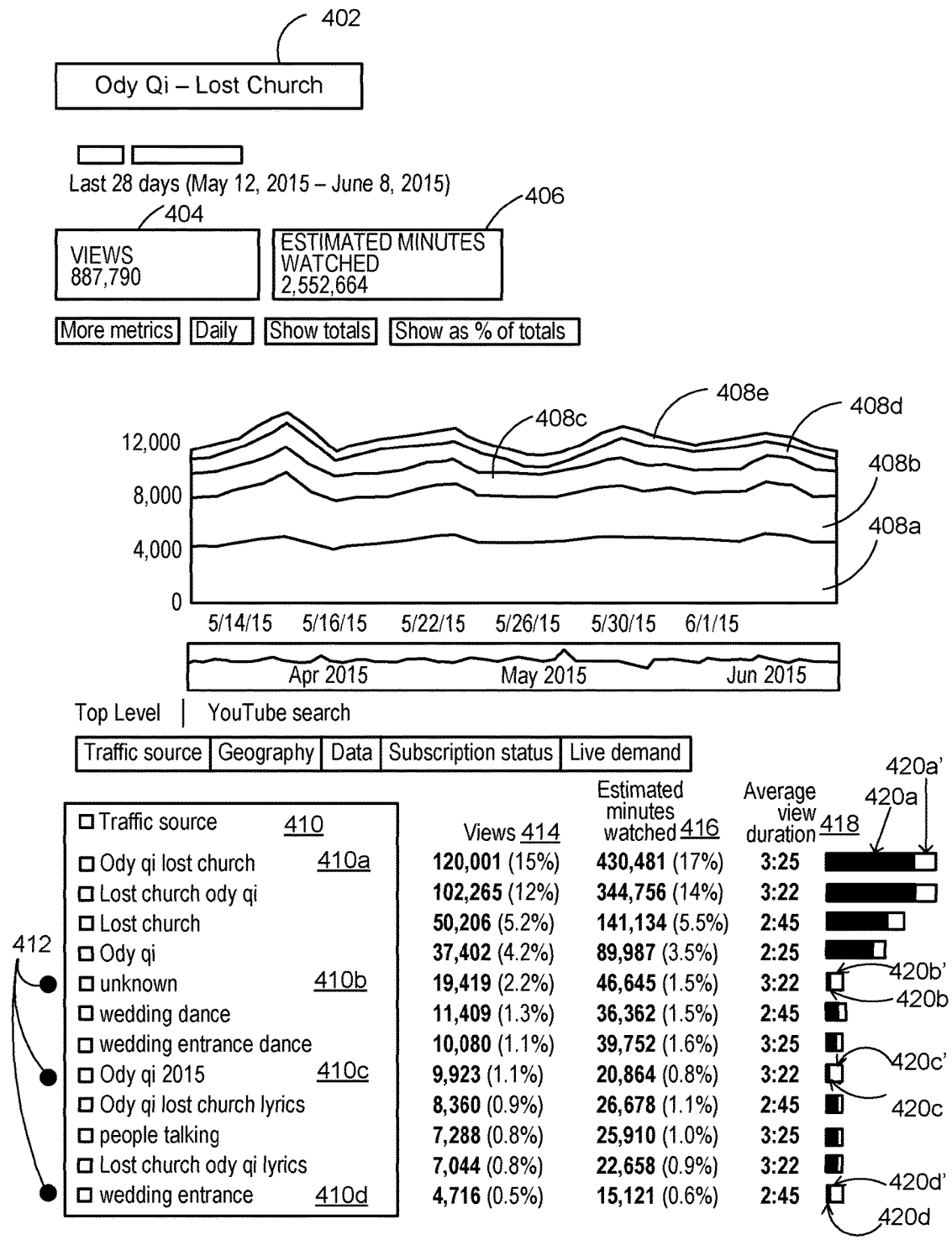
FIG. 4 illustrates an example user interface that displays information related to the monitored traffic of a video to the owner of the video.

FIG. 4 illustrates an example user interface 400 that displays information related to the monitored traffic of a video to the owner of the video. The user interface 400 presents various information related to a video including the monitored traffic and analysis thereof to the owner of the video. In the illustrated example, the user interface presents the video identifier 402 including the artist and the title. In addition, the user interface 400 presents information related to the monitored traffic such as the total view counts 404 and the total view durations 406 of the video 402. The competition monitoring and presentation module 208 aggregates the number of times a video has been watched over time and presents the determined quantity as the total view counts 404 in the user interface 400. The competition monitoring and presentation module 208 further aggregates the view duration that a video has been watched over time and presents the determined view duration as the total view durations 406 in the user interface 400. The user interface 400 also presents the search queries that lead users to the video 402 and the corresponding view counts associated with each search query. As illustrated, the video 402 is among the search results for the search queries 410. That is, the search queries 410 can lead users to the video 402 if a user inputs any one of the search queries 410. The search queries that lead users to the video 402 can be ranked by the traffic and presented in a descending order based on the associated view counts. As illustrated, the regions 408a-e represent the total view counts that the video 402 is viewed responsive to the search queries 410a-e, respectively. The total view counts corresponding to a search query increases by one each time a user finds and plays the music video 402 by using the search query.

The competition monitoring and presentation module 208 may further determine, for each search query, traffic that goes to an original video and that goes to competing videos. Each search query is associated with the view counts 414 and the total view duration 416 that users have viewed the video by using the search query as well as an average view duration 418. The competition monitoring and presentation module 208 determines the average view duration 418 for a search query by dividing the total view duration 416 by the view counts 414. Various search queries that lead users to a particular video may include different search terms and thus generate different amount of traffic. The search queries are organized according to the associated view counts and presented to the owner of the video in a descending order according to the view counts, view durations, or the average view duration. For example, search queries 410a and 410b include different search terms. The view counts associated with the search query 410a is much higher than the view counts associated with the search query 410b.

As illustrated, the length of the horizontal bar 420a represents the total view counts of the video 402 in response to the search query 410a and the length of the horizontal bar 420a' represents the view counts of competing videos of the video 402 in response to the search query 410a. Likewise, the lengths of the horizontal bars 420b through 420d represent the total view counts of the video 402 in response to the search queries 410b through 410d and the lengths of the horizontal bars 420b' through 420d' represent the view counts of competing videos of the video 402 in response to the search queries 410b through 420d, respectively. The user interface 400 graphically distinguishes the horizontal bars 420a through 420d and the horizontal bars 420a' through 420d'. As a result, the user interface 400 graphically distinguishes traffic leading to an original video from traffic leading to competing videos of the original video in response to a search query.

In addition, search queries can have different degrees of effectiveness. A search query is most effective when all generated traffic goes to the original video. The effectiveness of a search query may be measured by comparing the view counts of the original video to the view counts of the competing videos. The competition monitoring and presentation module 208 may compare the traffic that goes to the competing video to a traffic threshold. The traffic threshold is a predetermined amount used to evaluate whether a competing video attracts users' views. If the traffic (e.g., view counts, total view durations, average view durations) that goes to a competing video is greater than the traffic threshold, the competing video is determined to be substantial. The competition monitoring and presentation module 208 may notify the owner of the original video that the corresponding search query leads substantial amount of traffic to competing videos responsive to determining that the traffic going to the competing video greater than the traffic threshold. The competition monitoring and presentation module 208 may measure an effectiveness of a search query by comparing the traffic going to competing videos to the traffic going to the original video. The ratio of the traffic going to derivative videos to the traffic going to the original video may be compared to a threshold ratio. The owner of the original video may be notified that the search query is ineffective responsive to determining that the ratio of the traffic going to derivative videos to the traffic going to the original video greater than a threshold ratio.

The user interface 410 is configured to visually distinguish those search queries of which the effectiveness is determined to be less than a threshold. As illustrated, the search queries 410b through 410d are determined to be less effective because the ratio of the traffic going to competing videos to the traffic going to the original video is greater than a threshold ratio. The user interface 400 is configured to highlight the search queries 410b through 410d with alerts 412 that visually distinguish these search queries from the other search queries. As such, a user can be notified by the alerts 412 that the search queries 410b through 410d are less effective.

Referring back to FIG. 2, because the owner is presented with information related to different search queries that users use to access the video and its competing videos, the user may augment the video with additional metadata determined from the search queries. For example, the owner of a music video is notified of the search queries via which users access the music video that include two types of search terms: the title of the song and the lyrics of the song. The lyrics of the song may be incorporated as metadata associated with the music video. Accordingly, search results for search queries that include lyrics of the song will include the music video. Users that use the lyrics of the song in search queries will be directed to the music video.

The metadata recommendation module 210 determines and recommends metadata improvement to owners of original videos. For a video, the metadata recommendation module 210 may identify competing videos based on the search competition score determined for the two videos that are stored in the similarity data store 212. In addition, the metadata recommendation module 210 may identify the search queries that lead users to the competing videos. The metadata recommendation module 210 may extract the search terms used in the search queries, compare the search terms to the metadata associated with the original video, and identify search terms that are not present in the metadata associated with the original video. The metadata recommendation module 210 recommends the search terms that are determined as missing from the metadata associated with the original video to the owner of the original video.

For a user who is the owner of multiple original videos, the metadata recommendation module 210 may determine and recommend metadata improvement across all original videos to the owner. For each original video owned by a user, the metadata recommendation module 210 determines search terms included in the search queries that lead traffic to competing videos. Subsequently, the metadata recommendation module 210 may rank the search terms determined from all original videos owned by the user, according to the amount of traffic to corresponding competing videos. The metadata recommendation module 210 selects the top-ranked search term(s) with traffic to competing videos greater than a threshold, and recommends the selected top-ranked search terms to the user as metadata that can be associated with all original videos owned by the user.

Figure 3A:
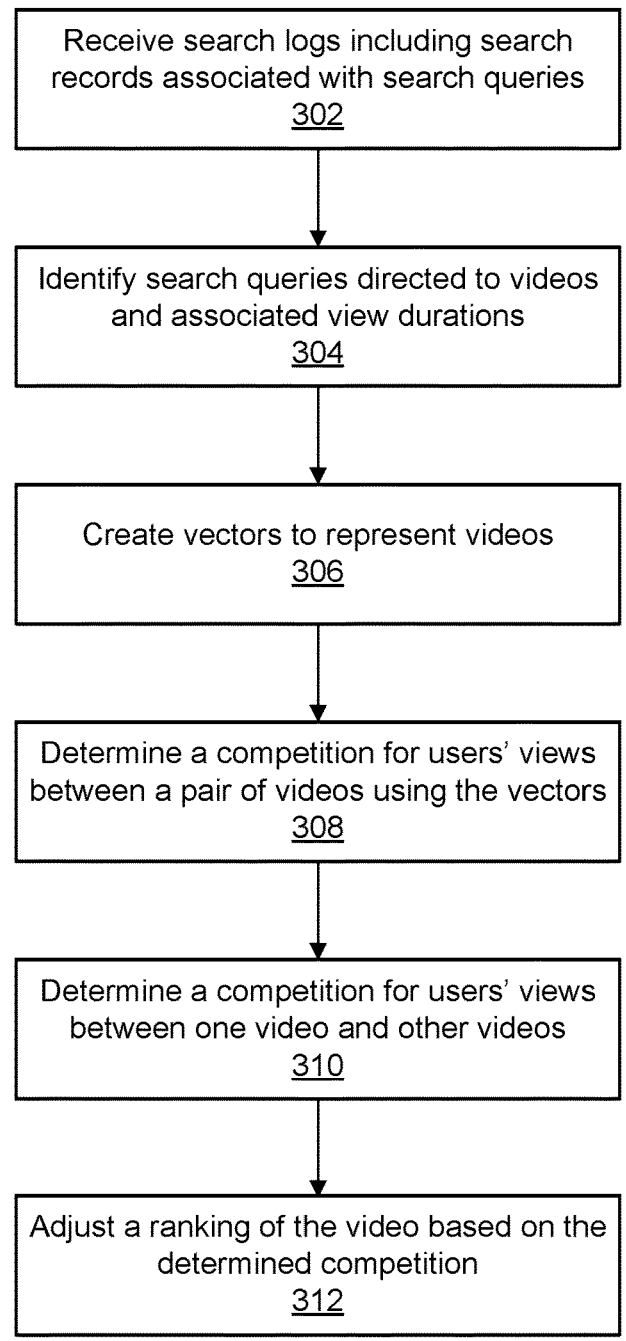
FIG. 3A illustrates a process of determining competition among videos, according to one embodiment.

FIG. 3A illustrates a process of determining competition among videos, according to one embodiment. The video competition engine 110 receives 302 search logs stored in the query data store 116. The video competition engine 110 identifies 304 search queries that are directed to the videos as well as the associated view durations. That is, for a video, the video competition engine 110 identifies search queries for which the video is a search result. For each search query identified for the video, the video competition engine 110 identifies the duration that the video is viewed responsive to the search query, for example, from the received search logs. The video competition engine 110 creates 306 vectors that represent videos. A vector created to represent a video is generated based on the search queries for which the video is a search result and the associated view durations. The dimensions of the vector correspond to the identified search queries.

The video competition engine 110 determines 308 a competition for users' views between two videos. That is, the competition between two videos for search queries is determined. The video competition engine 110 may determine a search competition score based on the vectors created to represent the two videos. In one embodiment, the search competition score may be determined by calculating a cosine similarity between two videos according to Equation (2).

For a video, the video competition engine 110 determines 310 a competition for users' views between the video and a set of videos. The similarity of the search queries that the set of videos collectively compete with a particular video for users' views is determined. The video competition engine 110 may aggregate the competitions determined between one video and each individual video of the set of videos to determine the competition between the video and the set of videos. In one embodiment, the collective search competition score is determined according to Equation (3). The video competition engine 110 may select the set of videos that collectively compete with the video for users' views. The set of videos may be selected based on content, owners, or to include all the other videos to which all search queries in the query space lead.

The video competition engine 110 may further determine a channel originality for a channel formed by a collection of videos. The channel originality measures the overall similarity between users' interests in the collection of videos and users' interests in other videos. An originality of a channel may be determined based on a collective search competition score determined for a video of the collection of videos and view durations associated with the video that can be determined from the search logs. A channel that is more original with a higher originality score reflects that the channel attracts more users' interests in comparison to its competing videos. A search competition score between a video and its competing video is greater than zero. Channels that are more original may be rewarded. For example, monetization of videos included in different channels can be adjusted based on the originality of the channel.

The search competition scores may be used to promote original content. A ranking of the video may be adjusted 312 based on the determined competition. For example, an original video and one or more competing videos are among the search results for a new search query. Ranking of the original video and the competing video(s) may be adjusted such that the original video may be ranked higher than the competing video(s). For example, for a particular video, a competing video is removed from the search results of a search query to promote the particular video if the search competition score determined for this video and the competing video is greater than a threshold. The competing video(s) may be removed from the search results for the search query. As another example, if a video is ranked lower than its competing video among the search results of a search query, the ranking of the video may be boosted to be relative higher than the competing video to promote the particular video if the search competition score determined for this video and the competing video is greater than a threshold.

Figure 3B:
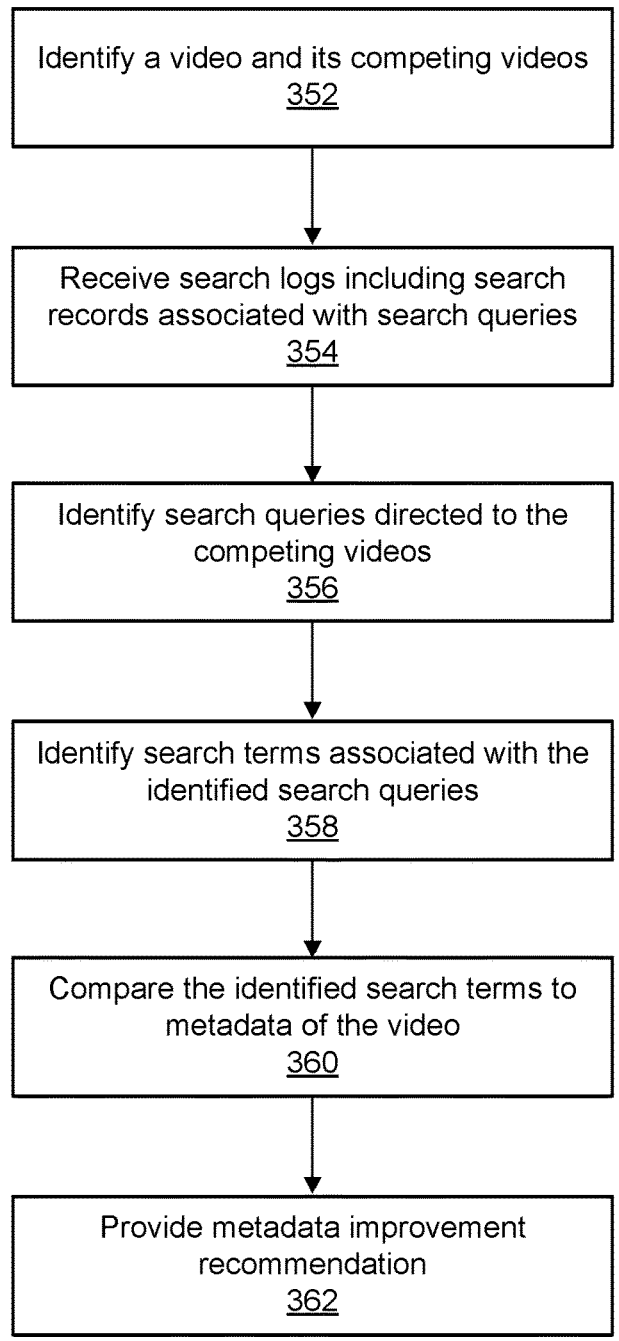
FIG. 3B illustrates a process of determining and recommending metadata improvements related to a video, according to one embodiment.

FIG. 3B illustrates a process of determining and recommending metadata improvements related to a video, according to one embodiment. The video competition engine 110 identifies 352 a video and the videos that compete with the video for search queries. The competing video for a video may be identified, for example, from a similarity data store 212. In one embodiment, the search competition scores are determined such that the search competition scores for the video and the competing videos exceed a threshold. The video competition engine 110 receives 354 search logs stored in the query data store 116.

The video competition engine 110 identifies 356 search queries that are directed to the competing videos. That is, for a competing video, the video competition engine 110 identifies search queries for which the competing video is a search result. For each search query identified for a competing video, the video competition engine 110 may identify the view duration that the competing video is viewed in response to the search query, for example, from the received search logs. The video competition engine 110 identifies 358 search terms associated with the identified search queries. The video competition engine 110 may identify the search terms used in the search queries, for example, from the search logs. The video competition engine 110 compares 360 the search terms to the metadata associated with the video. Responsive to determining that a search term does not exist in the metadata associated with the video, the video competition engine 110 may determine the search term as metadata improvement for the video. The video competition engine 110 provides 362 the metadata improvement for the video to a user (e.g., the owner) associated with the video.

The video competition engine 110 may update the metadata of the video to include the identified metadata improvement.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

The invention claimed is:

1. A method comprising:
receiving search records associated with search queries directed to a video hosting system, each search record identifying a set of videos available on the video hosting system that are search results for a corresponding search query and indicating associated view durations that videos in the set were viewed responsive to the search query;
identifying, from the received search records, first and second videos competing for views of users of the video hosting system, the first and second videos each having metadata respectively describing the first and second videos and each of the first and second videos having been provided in particular search results in response to a particular search query of the search queries directed to the video hosting system;
identifying, from the search records, a first set of search queries directed to the first video, the first video being a search result for search queries of the first set;
identifying search terms associated with the first set of search queries;
comparing the identified search terms to the metadata of the second video; and
responsive to the comparison indicating that the metadata of the second video does not include a search term from the search terms associated with the first set of search queries directed to the first video, identifying the search term as a metadata improvement to the second video;
providing, by a processor, the metadata improvement to a user of the video hosting system associated with the second video; and
updating the metadata of the second video to include the identified metadata improvement that is based on the search term from the search terms associated with the first set of search queries directed to the first video.

2. A method comprising:
receiving search records associated with search queries directed to a video hosting system, each search record identifying a set of videos available on the video hosting system that are search results for a corresponding search query and indicating associated view durations that videos in the set were viewed responsive to the search query;
identifying, from the received search records, first and second videos competing for views of users of the video hosting system, the first and second videos each having metadata respectively describing the first and second videos and each of the first and second videos having been provided in particular search results in response to a particular search query of the search queries directed to the video hosting system;
identifying, from the search records, a first set of search queries directed to the first video, the first video being a search result for search queries of the first set;
identifying search terms associated with the first set of search queries;
comparing the identified search terms to the metadata of the second video; and
responsive to the comparison indicating that the metadata of the second video does not include a search term from the search terms associated with the first set of search queries directed to the first video, identifying the search term as a metadata improvement to the second video; and
providing, by a processor, the metadata improvement that is based on the search term from the search terms associated with the first set of search queries directed to the first video to a user of the video hosting system associated with the second video.

3. The method of claim 2, further comprising:
updating the metadata of the second video to include the identified metadata improvement.

4. The method of claim 2, wherein identifying the first and second videos competing for views of users of the video hosting system comprises:
calculating a competition score indicating an amount of competition between the first video and the second video for views of users of the video hosting system based on the identified first and second sets of queries and associated view durations.

5. The method of claim 4, wherein the competition score measures a similarity between the search queries for which the first and second videos are competing, and wherein a higher competition score indicates that the two videos are competing for more similar search queries and a lower competition score indicates that the two videos are competing for less similar search queries.

6. The method of claim 4, wherein calculating the competition score comprises:
generating a first vector for the first video based on the identified first set of queries and associated view durations, the first vector representing a view duration of the first video being watched responsive to the first set of queries;
generating a second vector for the second video based on the identified second set of queries and associated view durations, the second vector representing a view duration of the second video being watched responsive to the second set of queries;
measuring a degree of similarity between the first and second vectors; and
calculating the competition score responsive to the measured degree of similarity.

7. The method of claim 2, wherein the first video includes at least one media content of the second video.

8. A system comprising:
a memory; and a processor, operatively coupled with the memory, to:
receive search records associated with search queries directed to a video hosting system, each search record identifying a set of videos available on the video hosting system that are search results for a corresponding search query and indicating associated view durations that videos in the set were viewed responsive to the search query;
identify, from the received search records, first and second videos competing for views of users of the video hosting system, the first and second videos each having metadata respectively describing the first and second videos and each of the first and second videos having been provided in particular search results in response to a particular search query of the search queries directed to the video hosting system;
identify, from the search records, a first set of search queries directed to the first video, the first video being a search result for search queries of the first set;
identify search terms associated with the first set of search queries;
compare the identified search terms to the metadata of the second video; and
responsive to the comparison indicating that the metadata of the second video does not include a search term from the search terms associated with the first set of search queries directed to the first video, identify the search term as a metadata improvement to the second video; and
provide the metadata improvement that is based on the search term from the search terms associated with the first set of search queries directed to the first video to a user of the video hosting system associated with the second video.

9. The system of claim 8, wherein the processor is further to:
update the metadata of the second video to include the identified metadata improvement.

10. The video of claim 8, wherein to identify the first and second videos competing for views of users of the video hosting system, the processor is further to:
calculate a competition score indicating an amount of competition between the first video and the second video for views of users of the video hosting system based on the identified first and second sets of queries and associated view durations.

11. The system of claim 10, wherein the competition score measures a similarity between the search queries for which the first and second videos are competing, and wherein a higher competition score indicates that the two videos are competing for more similar search queries and a lower competition score indicates that the two videos are competing for less similar search queries.

12. The system of claim 10, wherein to calculate the competition score, the processor is further to:
generate a first vector for the first video based on the identified first set of queries and associated view durations, the first vector representing a view duration of the first video being watched responsive to the first set of queries;
generate a second vector for the second video based on the identified second set of queries and associated view durations, the second vector representing a view duration of the second video being watched responsive to the second set of queries;
measure a degree of similarity between the first and second vectors; and
calculate the competition score responsive to the measured degree of similarity.

13. The system of claim 8, wherein the first video includes at least one media content of the second video.

14. A non-transitory computer-readable storage medium comprising instructions, which when executed by a processor, cause the processor to performs operations comprising:
receiving search records associated with search queries directed to a video hosting system, each search record identifying a set of videos available on the video hosting system that are search results for a corresponding search query and indicating associated view durations that videos in the set were viewed responsive to the search query;
identifying, from the received search records, first and second videos competing for views of users of the video hosting system, the first and second videos each having metadata respectively describing the first and second videos and each of the first and second videos having been provided in particular search results in response to a particular search query of the search queries directed to the video hosting system;
identifying, from the search records, a first set of search queries directed to the first video, the first video being a search result for search queries of the first set;
identifying search terms associated with the first set of search queries;
comparing the identified search terms to the metadata of the second video; and
responsive to the comparison indicating that the metadata of the second video does not include a search term from the search terms associated with the first set of search queries directed to the first video, identifying the search term as a metadata improvement to the second video; and
providing the metadata improvement that is based on the search term from the search terms associated with the first set of search queries directed to the first video to a user of the video hosting system associated with the second video.

15. The non-transitory computer-readable storage medium of claim 14, further containing computer program code executable to perform steps comprising:
updating the metadata of the second video to include the identified metadata improvement.

16. The non-transitory computer-readable storage medium of claim 14, wherein to identify the first and second videos competing for views of users of the video hosting system, the operations further comprise:
calculating a competition score indicating an amount of competition between the first video and the second video for views of users of the video hosting system based on the identified first and second sets of queries and associated view durations.

17. The non-transitory computer-readable storage medium of claim 16, wherein the competition score measures a similarity between the search queries for which the first and second videos are competing, and wherein a higher competition score indicates that the two videos are competing for more similar search queries and a lower competition score indicates that the two videos are competing for less similar search queries.

18. The non-transitory computer-readable storage medium of claim 16, wherein to calculate the competition score, the operations further comprise:
generating a first vector for the first video based on the identified first set of queries and associated view durations, the first vector representing a view duration of the first video being watched responsive to the first set of queries;

generating a second vector for the second video based on the identified second set of queries and associated view durations, the second vector representing a view duration of the second video being watched responsive to the second set of queries;

measuring a degree of similarity between the first and second vectors; and calculating the competition score responsive to the measured degree of similarity.

19. The non-transitory computer-readable storage medium of claim 14, wherein the first video includes at least one media content of the second video.

* * * * *